United States Patent

Sheppard et al.

[15] 3,661,523

[45] May 9, 1972

[54] PREPARATION OF TITANIUM CARBIDE

[72] Inventors: Robert S. Sheppard, Doylestown; William L. Wilson, Barberton, both of Ohio

[73] Assignee: PPG Industries, Inc., Pittsburgh, Pa.

[22] Filed: Apr. 14, 1970

[21] Appl. No.: 28,334

[52] U.S. Cl. ............................................23/208 A, 106/299
[51] Int. Cl. .......................................................C01b 31/30
[58] Field of Search ..................................................23/208 A

[56] References Cited

UNITED STATES PATENTS

| | | | |
|---|---|---|---|
| 3,253,886 | 5/1966 | Lamprey et al. | 23/208 A X |
| 2,155,682 | 4/1939 | Ridgway | 23/208 A |
| 2,856,269 | 10/1958 | Sabine et al. | 23/208 A |
| 2,962,388 | 11/1960 | Ruppert et al. | 23/208 A X |
| 3,340,020 | 9/1967 | Neuenschwander et al. | 23/208 A X |
| 2,285,837 | 6/1942 | Ridgway | 23/208 A X |
| 3,240,563 | 3/1966 | Mercuri et al. | 23/208 A X |
| 3,205,042 | 9/1969 | Jacobson | 23/208 A |

*Primary Examiner*—Herbert T. Carter
*Attorney*—Chisholm and Spencer

[57] ABSTRACT

Titanium carbide, usually in finely divided, particulate form, and often predominantly in the form of small cubic crystals having a particle size range of from about 0.02 to about 1.0 micron and a weight median particle size of from about 0.08 to about 0.8 micron, is formed by reacting titanium halide in vapor state with a reducing agent and carbon source at carbide forming temperatures. Reduction of impurity levels present in the titanium carbide product, e.g., oxygen and halogen, is obtained by collecting the titanium carbide product at temperatures of from about 350° C. to 1,500° C. in the substantial absence of air.

11 Claims, 1 Drawing Figure

PATENTED MAY 9 1972
3,661,523
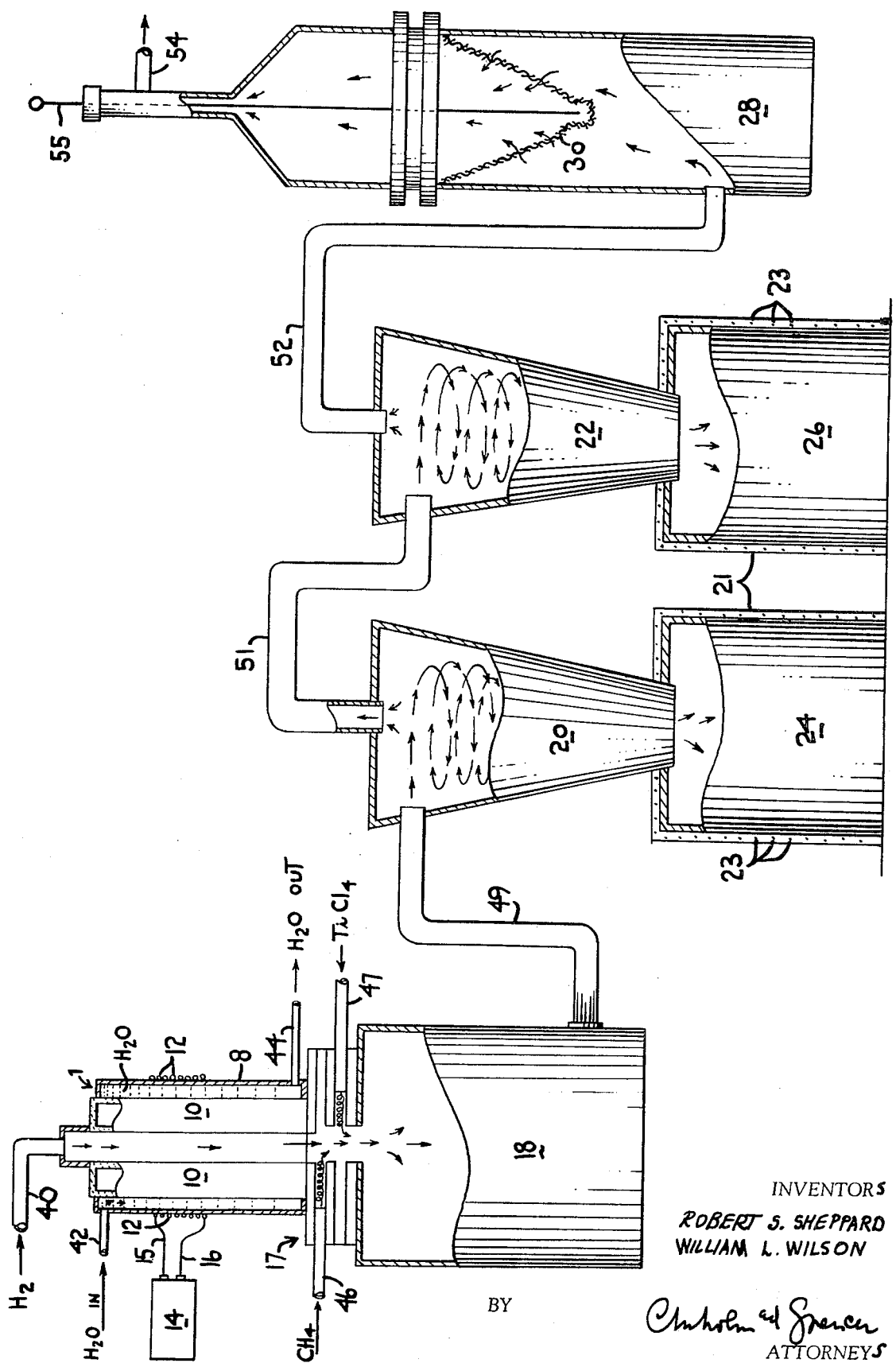
INVENTORS
ROBERT S. SHEPPARD
WILLIAM L. WILSON
BY Chisholm and Spencer
ATTORNEYS

PREPARATION OF TITANIUM CARBIDE

DESCRIPTION OF THE INVENTION

Titanium carbide has been produced conventionally by the reaction of a source of titanium dioxide with coke or a similar form of carbon in an electrothermal furnace. Another method that has been proposed for producing titanium carbide consists of inter-reacting in the vapor phase a source of carbon, a volatile halide of titanium and a reducing agent, such as aluminum, hydrogen or combinations thereof, in an enclosed reaction zone at carbide forming temperatures. See, for example, U. S. Pat. Nos. 3,205,042, 3,346,338, 2,952,598 and 3,340,020. See also U. S. Pat. No. 3,399,980 which describes a process for the preparation of titanium carbide from a titanium halide in the absence of a reducing agent. Typically, the source of carbon in the above type reactions has been coke and other solid forms of carbon, or volatile hydrocarbons, such as methane. More recently, it has been found that halogenated hydrocarbons or compounds of carbon and halogen are a useful source of carbon in the above-described vapor state process for the preparation of titanium carbide. See, for example, U. S. Pat. No. 3,485,586.

Titanium carbide is a commercially useful material. When finely divided and pigmentary in character, it is useful as a black pigmenting agent in, for example, paints. It has also been found useful when used in combination with tungsten carbide or when used alone for the preparation of cemented carbide compositions. Such compositions find application as cutting tools for the machining of hard metals such as steel and titanium. In the production of cemented carbides, it is conventional to combine the metallic carbide with a metal binder system. Such metallic binders are usually selected from metals of Group VI and Group VIII of the Periodic Chart of the Elements, e.g., molybdenum, iron, cobalt and nickel, or combinations thereof. The metal binder contributes strength to the system while the metallic carbide contributes hardness.

In the production of cemented titanium carbides, it is essential that the sintered carbide be as pore-free as possible in order to obtain good physical properties. The metal binder, which in the sintering process forms a liquid phase, assists in accomplishing this result by filling the spaces between the titanium carbide particles. However, in order to fill these spaces, the liquid metal binder must completely wet all of the carbide particles. Impure, and especially oxygen-bearing, titanium carbide is poorly wetted by the liquid metals typically used to prepare cemented carbides of titanium carbide. Thus, impure titanium carbide does not produce as good a cemented carbide as titanium carbide that is substantially free of impurities.

In the production of titanium carbide by vapor phase reaction of titanium halide with a reducing agent, such as hydrogen, and a carbon source, such as hydrocarbon and halogenated hydrocarbon (which is defined herein to mean and include compounds of halogen and carbon, and compounds of halogen, carbon and hydrogen), it has been conventional to quench the titanium carbide reactor discharge to temperatures below 300° C. as quickly as possible in order to avoid growth of the titanium carbide particles. The halogen and oxygen contents of titanium carbide produced in this manner, while directly proportional to the surface area, vary typically from 1 to 2 weight percent after exposure to air. Such levels of oxygen and/or halogen impurity are too high and yield cemented carbide compositions having a comparatively low transverse rupture strength. It has now been found that both the oxygen and halogen levels of titanium carbide produced in the manner above described, can be reduced to lower levels, e.g., less than 1 weight percent, typically less than 0.70 weight percent and usually less than 0.5 weight percent, by collecting titanium carbide reactor discharge at temperatures of at least 350° C. in the substantial absence of air, i.e., the atmospheric environment.

BRIEF DESCRIPTION OF THE DRAWING

The process of the invention described herein can be conducted using any convenient equipment. Typical equipment which can be used in the practice of the present invention is diagrammatically illustrated in the accompanying drawing in which there is shown a diagram of an assemblage partially broken away in sections, comprising a gas heating system or plasma arc heater, a reactor and auxiliary equipment for recovering titanium carbide.

It is known that titanium carbide can be produced by inter-reacting in the vapor state titanium halide, such as titanium tetrachloride, a source of carbon such as a volatile hydrocarbon or halogenated hydrocarbon and a reducing agent, such as hydrogen, at carbide forming temperatures. Average reaction temperatures typically used for the production of such carbides are normally above 1,500° C., and usually range from about 1,500° C. to about 4,000° C. or above.

Typical of the titanium halides that can be employed in the above-described process include: titanium tetrachloride, titanium tetrabromide, titanium tetraiodide, and titanium tetrafluoride, as well as subhalides of titanium, such as titanium dichloride, titanium trichloride and titanium trifluoride. Of course, subhalides other than the subchlorides and subfluorides can be used in the same manner. Further, mixtures of halides, such as the chlorides and the bromides, can be employed as the titanium halide reactant.

The above-described process for producing titanium carbide by vapor phase reaction of titanium halide is typically conducted in the presence of a reducing agent, such as aluminum, hydrogen or combinations thereof. Typically, hydrogen alone is used.

In the process described herein, volatile hydrocarbons or halogenated hydrocarbons can be used as the source of carbon. As used herein, the term "halogenated hydrocarbon," e.g., "chlorinated hydrocarbons," is intended to mean and include both compounds of carbon, halogen and hydrogen and compounds of carbon and halogen, e.g., carbon tetrachloride. Typical of hydrocarbons that can be used as a source of carbon in the process described herein include the normally gaseous or liquid but relatively volatile hydrocarbons including saturated and unsaturated $C_1$–$C_{12}$ hydrocarbons such as methane, ethane, propane, the butanes, the pentanes, decanes, dodecanes, ethylene, propylene, the butylenes and amylenes, symmetrical dimethylethylene and like alkenes, cycloaliphatic and aromatic hydrocarbons, such as cyclopentane, cyclohexane, toluene, benzene, etc., acetylenic compounds of which may be noted acetylene, methyl acetylene, ethyl acetylene, and dimethyl acetylene. Methane or propane are economically preferred for this purpose. Rarely are hydrocarbons of more than twelve carbons used.

Examples of halogenated hydrocarbons that can be used as the source of carbon in the process described herein include compounds containing from one to eight carbon atoms, such as methyl chloride, chloroform, methylene chloride, carbon tetrachloride, dichlorodifluoromethane, amyl chloride, chloroethane, vinyl chloride, 1,1-dichloroethylene, 1,2-dichloroethylene 1,1-dichloroethane, 1,2-dichloroethane, ethylene dibromide, trichloroethylene, perchloroethylene, propylene dichloride, 1,1,2-trichloroethane, 1,1,1-trichloroethane, 1,1,1,2- and 1,1,2,2-tetrachloroethane, hexachloroethane, and like aliphatic chlorides, fluorides, bromides or iodides, containing up to about eight carbon atoms, preferably up to about six carbon atoms. Aromatic halocarbon compounds, e.g., chlorocarbon compounds, also can be used. Such compounds include $C_6$–$C_9$ halogenated aromatic compounds such as monochlorobenzene, orthodichlorobenzene, paradichlorobenzene and the like. Cycloaliphatic halides such as the $C_5$–$C_6$ aliphatic halides, e.g., chlorinated cyclopentadiene, cyclohexylchloride, etc., can also be used.

Typically, the above-described hydrocarbons and halogenated hydrocarbons should be readily vaporizable (volatile) without tar formation since otherwise unnecessary difficulties which are unrelated to the process itself can arise, such as plugging of lines by decomposition and/or polymerization products produced in the course of vaporizing the hydrocarbons.

The amount of reducing agent, e.g., hydrogen, utilized in the above-described process should be at least that amount which is required stoichiometrically to satisfy the theoretical demand of the reaction. Typically, the amount of hydrogen used is in substantial excess of the theoretical amount. When the titanium halide used is titanium tetrachloride, and a chlorinated hydrocarbon is used as the source of carbon, the theoretical amount or demand of hydrogen required can be expressed by the equation:

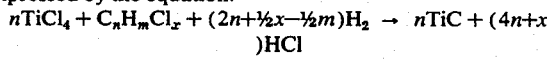

wherein
n reflects the number of carbon atoms,
m reflects the number of hydrogen atoms, and
x reflects the number of chlorine atoms
in the compound of chlorine and carbon used. Similarly, when other titanium halides are used, the amount of elemental hydrogen used should be well in excess of the chemical equivalent of the halogen of the titanium halide. Often, the amount of hydrogen utilized will be in excess of 10 times and as high as 100 times the amount of hydrogen shown to be required by the above equation or required to equal the chemical equivalence of halogen of the titanium halide.

The amount of hydrocarbon or halogenated hydrocarbon used as the source of carbon in the above-described process is also used in at least stoichiometric quantities of the amount required by the above equation or required to equal the chemical equivalence of the titanium halide. Usually, at least 20 percent and often 50 to 300 percent in excess of the amount required by the above equation is used.

In carrying out the vapor phase reaction of titanium halide to form titanium carbide in the manner described above, any convenient method can be employed. Thus, for example, all of the reactants can be heated to or above reaction temperature and then admixed in a suitable reaction zone or one or more but not all of the reactants can be heated to temperatures in excess of reaction temperature and admixed in the reaction zone with other reactant(s) which have been introduced into the reaction zone at temperatures below reaction temperature. The highly heated reactant(s) bring the remaining reactant(s) to reaction temperature quickly and causes formation of titanium carbide.

A convenient method for producing titanium carbide is illustrated in the accompanying FIGURE. Referring now to the FIGURE, there is shown a plasma gun or torch 1 mounted atop mixing apparatus 17 which, in turn, is mounted atop reactor 18. Plasma heater 1 comprises a quartz tube 10 surrounded by cooling jacket 8 which is provided with an inlet 42 and an outlet 44 through which a suitable coolant, such as water, can be passed. Quartz tube 10 has an axial hollow core through which plasma forming gas, such as hydrogen, can be introduced through inlet tube 40. Surrounding quartz tube 10 and cooling jacket 8 is high-frequency induction coil 12 which is typically composed of several (4-6) turns of heavy copper conductor which, in turn, is externally cooled. The cooling means for coil 12 is not shown. Induction coil 12 is connected by leads 15 and 16 to a suitable power supply 14.

Mixing apparatus 17 is typically cylindrical in shape, although any suitable geometric design can be used, and is fitted with inlet tubes for introducing reactant gas. As shown, mixing apparatus 17 is provided with inlet tube 46 for introducing methane as the carbon source and introduction tube 47 for introducing titanium tetrachloride as the source of titanium. Although methane and titanium tetrachloride are shown, any of the equivalent hydrocarbons, halogenated hydrocarbons, and titanium halides described hereinabove can be substituted, respectively, for these reactants. In addition, if an inert gas, such as argon or helium, is used as the plasma forming gas in place of the hydrogen shown, then mixing apparatus 17 might be provided with another introduction tube for introducing hydrogen reductant to the reactor. Reactants methane, titanium tetrachloride and hydrogen can be introduced through mixer 17 in any suitable manner. Thus, the reactants can be introduced radially, tangentially, or at any suitable angle therebetween into the downwardly directed flame of plasma gas. Although the methane and titanium tetrachloride are shown being introduced at an angle of 90° in parallel planes to the downwardly directed plasma flame, they can be introduced at the same level. Further, the angle of reactant introduction can vary from the 90° angle shown, e.g., it can be directed downwardly into the plasma flame or even parallel to it. If desired, inert gas, such as hydrogen, chlorine, argon, helium, etc., can be introduced through mixing apparatus 17 separately or together with the reactant gas to prevent a reaction from occurring within the confines of mixer 17 or at a point immediately adjacent thereto.

Reactor 18 can be fabricated from any suitable material which withstands the temperatures and corrosive environment of the vapor phase reaction. Similarly, mixer 17 will be fabricated from suitable materials, such as graphite, molybdenum, or other materials which withstand the temperatures and corrosive environment present therein.

Reactant gases mix and inter-react within reactor 18, which is usually externally cooled. Following reaction, the titanium carbide produced has typically been quenched to below 300° C. in order to minimize particle growth. Such cooling has been accomplished by cooling means associated with the reactor as well as the product recovery apparatus. In accordance with a preferred embodiment of the present invention, heat removal from the reactor and recovery equipment is controlled so that the titanium carbide product is maintained at 350° C. or above. Such control can be easily exercised by regulating the heat loss from the reactor and recovery equipment by selection of materials of construction, rate of coolant circulation, external heating, etc. In a further embodiment of the present process, when equipment selection or operation cannot prevent the titanium carbide product from reaching temperatures below 350° C., significant improvement in impurity levels is still obtained by maintaining the solid product receivers at temperatures sufficient to reheat the titanium carbide to temperatures of at least 350° C.

While not intending to be bound by any particular theory, it is believed that unreacted gases, e.g., titanium halide, halogenated hydrocarbon, etc., adsorbed on the surface of the finely divided titanium carbide are the source of impurities such as chlorine and oxygen. When the product titanium carbide is exposed to the air, adsorbed unreacted gases are converted to such chemical species as titanium oxide and titanium oxychlorides which are difficult to remove even at calcination temperatures of 1,000° C. or higher. However, by collecting the TiC product at temperatures of at least 350° C. before substantial exposure to air, the unreacted adsorbed gases on the TiC surface can be substantially volatilized and removed.

Collection temperatures of from 350°–500° C. have been found useful and efficient for lowering impurity levels; however, higher temperatures can be used. Thus, temperatures of up to about 1,500° C., the average reaction temperature, could be employed. Usually, temperatures of 1,000° C. or below will be used and, preferably, temperatures of from about 350° to 800° C. are used. The exact temperature of collection will depend, however, on the particular equipment, heat losses, available extraneous heat sources, etc.

The product titanium carbide is held at collection temperatures of at least 350° C. for a period of time sufficient to yield a product of reduced oxygen and halogen, e.g., chlorine impurity, i.e., usually for a time sufficient to remove substantially all of the volatile halogen-containing species adsorbed on the product surface. In a batch process, the elapsed time for each production run is usually sufficient. In a continuous process, treatment in the above-described manner would be included in the processing scheme before exposure to air, e.g., heat treatment in a furnace or rotary calciner type of equipment that is tied directly into the product treatment line. While the period of heat treatment will depend to an extent indicative the temperatures employed and the particle size of the product, treatment times of from about 30 minutes to about 8 hours will be typical. To ascertain when heat treatment is sufficient, resort can be made to chemical analysis of vapors removed from the product collectors or of the product itself. In the former, the substantial absence of halogen species is indicative of a sufficient heat treatment; while in the latter, the level of oxygen and halogen in the product is a guide.

The process of the present invention can be performed in any convenient manner. Thus, the titanium carbide can be collected and heat treated in one step, i.e., in the collection vessel, before its exposure to the air and moisture of the atmosphere. Alternatively, the process can be performed in successive steps of recovery and heat treatment. Further, the steps of recovery and heat treatment need not be successive, provided that the titanium carbide is not exposed to the atmosphere in the interim processing step, which step may, for example, be size classification, milling, degassing, etc.

As shown in the drawing, finely divided titanium carbide product suspended in product gases as well as excess reactant gas, hereinafter collectively referred to as product gases or other equivalent term, is removed from reactor 18 through conduit 49 and is introduced sequentially into cyclones 20 and 22 in order to separate the solid titanium carbide product from the product gases. As shown, the discharge is introduced tangentially into cyclones 20 and 22 by conduits 49 and 51 respectively. The heavier titanium carbide particles precipitate out into receivers 24 and 26 while gaseous effluent leaves cyclones 20 and 22 through conduits 51 and 52 respectively. Receivers 24 and 26 are heated to temperatures sufficient to maintain the titanium carbide product at at least 350° C. by heating mantles 21 which have imbedded therein electrical resistance wires 23. Electrical connections of heating mantles 21 to a suitable power source is not shown. While electrical heating mantles are shown, any suitable heating means can be employed. Although only two cyclones, 20 and 22, are shown, more than two, e.g., three or four in series, can be used. Similarly, if properly sized, only one cyclone need be employed. If desired, receivers 24 and 26 can be provided with an inert gas purge such as argon or hydrogen in order to carry volatiles out of the receivers.

Gaseous effluent and unprecipitated solids removed from cyclone 22 through conduit 52 are forwarded to a solids separation chamber 28 in which there is disposed a bag filter 30, electrostatic precipitator or other convenient means for separating suspended solids from a gas. The separation chamber 28 also has an exit or exhaust 54 at its upper portion on the opposite side of the bag filter. As shown, the bag filter has engaged therewith a suitable shaking means 55 to clear the filter of titanium carbide.

In carrying out the process described herein and in accordance with the equipment described in connection with the drawing, plasma gas, such as argon, or argon-hydrogen mixtures, is introduced into plasma heater 1 through conduit 40. Induction coil 12 is energized by power supply 14. The magnetic field thereby produced couples to and energizes the plasma gas flowing through quartz tube 10 to produce a plasma flame, which is directed downwardly through the coaxial openings in mixer 17 and reactor 18. Reactant gases, methane and titanium tetrachloride, are introduced through mixer 17 and mixed with the plasma gas in reactor 18 where inter-reaction occurs to form titanium carbide.

Titanium carbide suspended in reactor effluent product gas is removed from reactor 18 and separated in cyclones 20 and 22. Heating means appended to receivers 24 and 26 maintain the temperature of the product titanium carbide at at least 350° C. Product gas, substantially devoid of its TiC content, is removed into gas separation chamber 28 where it is separated from any remaining suspended TiC. The product gas now removed of its titanium carbide burden can be further treated to remove its noxious components, such as HCl, before being burned or discharged to the atmosphere.

At the end of the production run or when the receivers are full, the titanium carbide is permitted to cool to room temperature by conduction, convection, and radiation. The product is then removed from the receivers and exposed to the atmosphere. It has been found that when the process of the present invention is practiced, the subsequent exposure to air does not significantly increase the oxygen impurity level of the titanium carbide product. The titanium carbide produced is typically submicron in character and varies from about 0.02 to about 1.0 micron. It is not pyrophoric.

The present process is more particularly described in the following examples which are intended as illustrative only since numerous modifications and variations therein will be apparent to those skilled in the art. In the following examples, volumes of gas are expressed in cubic feet per hour at standard conditions (14.7 pounds pressure and 70° F.).

EXAMPLE I

Utilizing equipment substantially similar to that of the drawing, a plasma flame was produced by supplying an argon-hydrogen mixture to an induction plasma heater. The plasma gas contained 78.4 SCFH (standard cubic feet per hour) of argon and 42.7 SCFH hydrogen. The induction coil was a five-turn externally cooled copper coil energized by a 25 kilowatt Toccotron operating at about 4.5 megahertz. The quartz tube which confined the plasma gas was externally cooled by circulating water. The argon-hydrogen plasma flame produced by the induction heater was calculated to have an enthalpy of about 294 B.T.U./ft$^3$.

A mixture of 6.6 SCFH of methane and 31.4 SCFH of argon at room temperature (about 23° C.) and a mixture of titanium tetrachloride (29.9 grams per minute) with 1.9 SCFH of argon having a temperature of about 200° C. were introduced into the hydrogen-argon plasma flame.

The hot plasma gas plus reactants and argon carrier gas were projected into the reactor as a result of aspiration by the downwardly projected plasma gas. The temperature of the ensuing reaction was calculated to be about 1,700° C. The reactor was fabricated from copper and externally cooled with water. Titanium carbide suspended in product gases was discharged from the reactor and separated from product gases by flowing the reactor effluent into two cyclone separators and a solid-gas separation chamber containing a bag filter which were connected in series. The product receivers connected to the cyclones were maintained at about 500° C. with heating mantles during the entire run and thereafter until all unreacted titanium tetrachloride had been purged from the apparatus. After about 85 minutes, reactant flow was stopped and the titanium carbide in the receivers allowed to cool under an argon atmosphere to room temperature before exposure to the atmosphere. The percent yield of titanium carbide based on TiCl$_4$ feed was 86.3 percent. The titanium carbide product from both receivers was analyzed and found to contain an average of 0.42 percent chlorine, 0.295 percent oxygen, 19.65 percent combined carbon, 0.535 percent free carbon, and 78.45 percent titanium.

EXAMPLE II

The procedure of Example I was repeated except that the product receivers were maintained at about 400° C. and three instead of two cyclones with receivers were used in series. The titanium carbide recovered from the three cyclones were combined and analyzed. The titanium carbide was found to contain 0.64 percent chlorine, 0.35 percent oxygen 19.1 percent combined carbon, 0.32 percent free carbon and 78.7 percent titanium.

EXAMPLE III

The procedure of Example I was repeated except that the receivers were not heated and the product was collected at about 4°-50° C. The titanium carbide produced in this manner was analyzed and found to contain 1.20 percent chlorine, 1.1 percent oxygen, 18.95 percent combined carbon, 0.65 percent free carbon and 77.7 percent titanium.

The data of Examples I–III show that collection at temperatures above 350° C. of titanium carbide produced by vapor phase reduction of titanium halide in the absence of air significantly decreases the level of chlorine and oxygen present in the product.

Although the present process has been described with reference to specific details of certain embodiments thereof, it is not intended that such details should be regarded as limitations upon the scope of the invention except as and to the extent that they are included in the accompanying claims.

What is claimed is:

1. A process for producing titanium carbide which comprises, in combination, the steps of (a) reacting in the vapor phase titanium halide, a source of carbon and reducing agent in an enclosed reaction zone thereby producing finely divided titanium carbide, (b) removing titanium carbide product from said reaction zone, (c) subjecting titanium carbide product thus removed to temperatures of from about 350° C. to about 1,000° C. for a time sufficient to remove volatile halogen-containing species adsorbed on the product surface, said steps (a), (b) and (c) being performed in the substantial absence of air, and (d) recovering finely divided titanium carbide having less than 1 weight percent each of oxygen and halogen.

2. The process of claim 1 wherein said titanium halide is titanium tetrachloride and said halogen is chlorine.

3. The process of claim 2 wherein said source of carbon is selected from the group consisting of hydrocarbons and halogenated hydrocarbons and said reducing agent is hydrogen.

4. The process of claim 1 wherein an inert gas atmosphere is maintained above the product titanium carbide during step (c).

5. The process of claim 4 wherein said inert gas is argon or hydrogen.

6. A process for producing titanium carbide which comprises, in combination, the steps of (a) reacting in the vapor phase titanium tetrachloride, a source of carbon and reducing agent in an enclosed reaction zone at temperatures above 1,500° C. thereby producing finely divided titanium carbide, (b) removing titanium carbide product from said reaction zone, (c) subjecting titanium carbide product thus removed to temperatures of from about 350° C. to about 1,000° C. for a time sufficient to remove volatile halogen-containing species adsorbed on the product surface, said steps (a), (b) and (c) being performed in the substantial absence of air, and (d) recovering finely divided titanium carbide having less than 0.7 weight percent each of oxygen and halogen.

7. A process for producing titanium carbide which comprises, in combination, the successive steps of (a) reacting in the vapor phase titanium halide, a source of carbon selected from the group consisting of hydrocarbons and halogenated hydrocarbons and hydrogen in an enclosed reaction zone at temperatures above 1,500° C. thereby producing finely divided titanium carbide, (b) removing titanium carbide product from said reaction zone, (c) subjecting titanium carbide product thus removed to temperatures of from about 350° C. to about 1,000° C. for a time sufficient to remove volatile halogen-containing species adsorbed on the product surface, said steps (a), (b) and (c) being performed in the substantial absence of air, and (d) recovering finely divided titanium carbide having less than about 0.5 weight percent each of oxygen and halogen.

8. The process of claim 7 wherein said titanium halide is titanium tetrachloride and said halogen is chlorine.

9. The process of claim 7 wherein the temperatures of step (c) are from 350° C. to about 800° C.

10. The process of claim 9 wherein an inert gas atmosphere is maintained above the titanium carbide during said heat treatment.

11. The process of claim 10 wherein said inert gas is argon or hydrogen.

* * * * *